(12) United States Patent
Bates et al.

(10) Patent No.: US 8,768,138 B1
(45) Date of Patent: Jul. 1, 2014

(54) VERY HIGH SPEED, MULTIPLE PATH FAILOVER SYSTEM FOR CONTINUING DIGITAL CINEMA PROJECTION CONTENT AVAILABILITY

(75) Inventors: Gary E. Bates, Marlborough, MA (US); William R. Main, Jr., Marblehead, MA (US); Harry M. Mathias, Thousand Oaks, CA (US)

(73) Assignee: NEC Display Solutions, Ltd., Tokyo (JP)

( * ) Notice: Subject to any disclaimer, the term of this patent is extended or adjusted under 35 U.S.C. 154(b) by 815 days.

(21) Appl. No.: 13/022,301

(22) Filed: Feb. 7, 2011

Related U.S. Application Data

(63) Continuation of application No. 11/257,412, filed on Oct. 24, 2005, now abandoned.

(51) Int. Cl.
| | |
|---|---|
| *H04N 5/765* | (2006.01) |
| *H04N 5/76* | (2006.01) |
| *G03B 41/02* | (2006.01) |
| *A63J 25/00* | (2009.01) |
| *G03B 21/32* | (2006.01) |

(52) U.S. Cl.
CPC .............. *G03B 41/02* (2013.01); *A63J 25/00* (2013.01); *G03B 21/32* (2013.01)
USPC ......................................... 386/200; 386/231

(58) Field of Classification Search
CPC .......... G03B 41/02; G03B 21/32; A63J 25/00
USPC ................................. 386/200, 231, 233, 314
See application file for complete search history.

(56) References Cited

U.S. PATENT DOCUMENTS

| | | | | |
|---|---|---|---|---|
| 6,384,893 B1 * | 5/2002 | Mercs et al. | .................. | 352/133 |
| 6,957,232 B2 * | 10/2005 | Hoeye et al. | .......................... | 1/1 |

* cited by examiner

*Primary Examiner* — Robert Chevalier
(74) *Attorney, Agent, or Firm* — McGinn IP Law Group, PLLC

(57) ABSTRACT

In one embodiment, the present invention provides a method and apparatus to insure continuous presentation of digital content to an audience when a locally stored copy of a file containing the digital content suddenly becomes unavailable to a digital projector. In one embodiment of the method, a first computer generates a first command to read a first block of data from a file stored on a first memory device, wherein the first computer system is coupled to a digital projector. The first computer system also generates a second command, which is subsequently transmitted to a storage device external to the computer system. The external storage device includes a hard disk that stores a copy of the file that is stored on the first memory device or vice versa. The external storage device includes a read/write head. In response to the external storage device receiving the second command, the read/write head is moved to a position on the hard disk where the read/write head can read a copy of the first block of data stored on the hard disk.

1 Claim, 3 Drawing Sheets

VERY HIGH SPEED, MULTIPLE PATH FAILOVER SYSTEM FOR CONTINUING DIGITAL CINEMA PROJECTION CONTENT AVAILABILITY

CROSS-REFERENCE TO RELATED APPLICATIONS

The present patent application is a continuation of U.S. patent application Ser. No. 11/257,412 filed on Oct. 24, 2005 now abandoned, entitled "Very High Speed, Multiple Path Failover System For Continuing Digital Cinema Projection Content Availability"; which is related to U.S. patent application Ser. No. 11/257,486 filed on Oct. 24, 2005, entitled "System And Method For Remote Management And Monitoring Of Multiplex Theater Digital Cinema Operations";

U.S. patent application Ser. No. 11/257,422, filed on Oct. 24, 2005, entitled "LAN or WAN Remote Access and Management of Digital Cinema Screen Servers"; and U.S. patent application Ser. No. 11/257,490 filed on Oct. 24, 2005, entitled "High Speed Transfer Of Movie Files And Other Content Between Shared Storage And Screen Servers To Enhance Content Availability In A Digital Cinema System."

All applications are incorporated herein by reference in their entirety.

BACKGROUND OF THE INVENTION

Movies are typically distributed to theaters on heavy reels of film. When received, a set of reels containing a movie is moved to a projection booth, and there the film on the reels is spliced together. Pre-movie content such as advertisements, movie trailers, theater announcements, etc., is also spliced to the movie prior to showtime. The process of distributing, receiving and preparing a movie for presentation can be an expensive and labor-intensive process.

Movies and pre-movie content can now be distributed, received and shown in digital format. When received by a theater, digital movies and digital pre-movie content can be stored in respective files on a disk drive of a computer system (e.g., a server), which in turn is coupled to a digital projector. At showtime digital content of a movie or pre-movie content is read from an opened file and provided to the digital projector for presentation to an audience. Unfortunately, heavily-accessed playout disk drives or other components can fail at the worst of times, i.e., while a movie is being presented to an audience. A disk drive or other component failure may disrupt the flow of digital content from an opened movie file to the digital projector, thus disrupting the movie's presentation.

SUMMARY OF THE INVENTION

In one embodiment, the present invention provides a method and apparatus to insure continuous presentation of digital content to an audience when a locally stored copy of the file containing the digital content suddenly becomes unavailable to a digital projector. In one embodiment of the method, a first computer coupled to a digital projector generates a first command to read a first block of data from a file stored on a first memory device. The first computer system also generates a second command, which is subsequently transmitted to a storage device external to the computer system. The external storage device includes a hard disk that stores a copy of the file that is stored on the first memory device or vice versa. The external storage device includes a read/write head. In response to the external storage device receiving the second command, the read/write head is moved to a position on the hard disk where the read/write head can read a copy of the first block of data stored on the hard disk. In one embodiment, the read/write head does read a copy of the first block of data stored on the hard disk. This first block of data read from the hard disk is then stored in local memory (e.g., a cache) of the storage device, but is not returned to the first computer system until the first computer system specifically requests it. The first data block read from the hard disk may or may not be returned to the first computer system.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

In one embodiment the present invention provides a method and apparatus to insure continuous presentation of digital content to an audience when a locally stored copy of the digital content suddenly becomes unavailable to a digital projector. In one embodiment, continuous presentation of digital content is made possible by tracking the digital content stored in shared memory of a digital cinema system as the digital content copy is read out of a local memory coupled to the digital projector. The present invention will be described with reference to continuous presentation of a digital movie, it being understood that the present invention can be employed to insure the continuous presentation of other digital content such as movie trailers, announcements, advertisements, etc.

In the following description, a preferred embodiment of the present invention would ordinarily be implemented as a software program executing on one or more computer systems (e.g., servers) or equivalents thereof, although those skilled in the art will readily recognize that the equivalent of such software may also be constructed in hardware. If the invention is implemented as a computer program, the program may be stored in a conventional computer readable medium, that may include, for example: magnetic storage media such as a magnetic disk (e.g., a floppy disk or a disk drive) or magnetic tape; optical storage media such as an optical disk, optical tape, or machine readable bar code; solid state electronic storage devices such as random access memory (RAM) or read-only memory (ROM); or any other device or medium employed to store computer program instructions.

Figure 1:
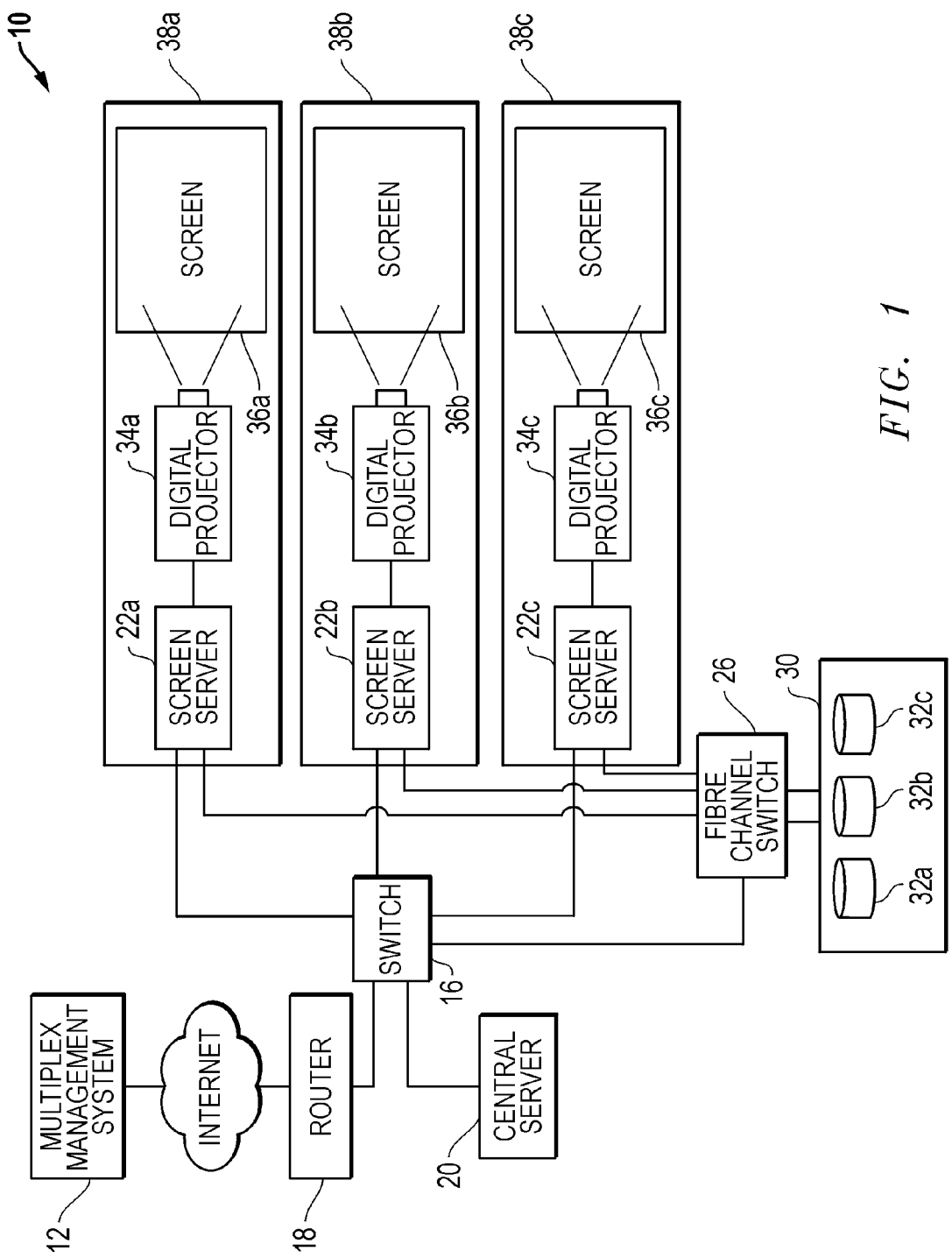
FIG. 1 is a block diagram illustrating relevant components of an exemplary digital cinema system employing one embodiment of the present invention.
Figure 2:
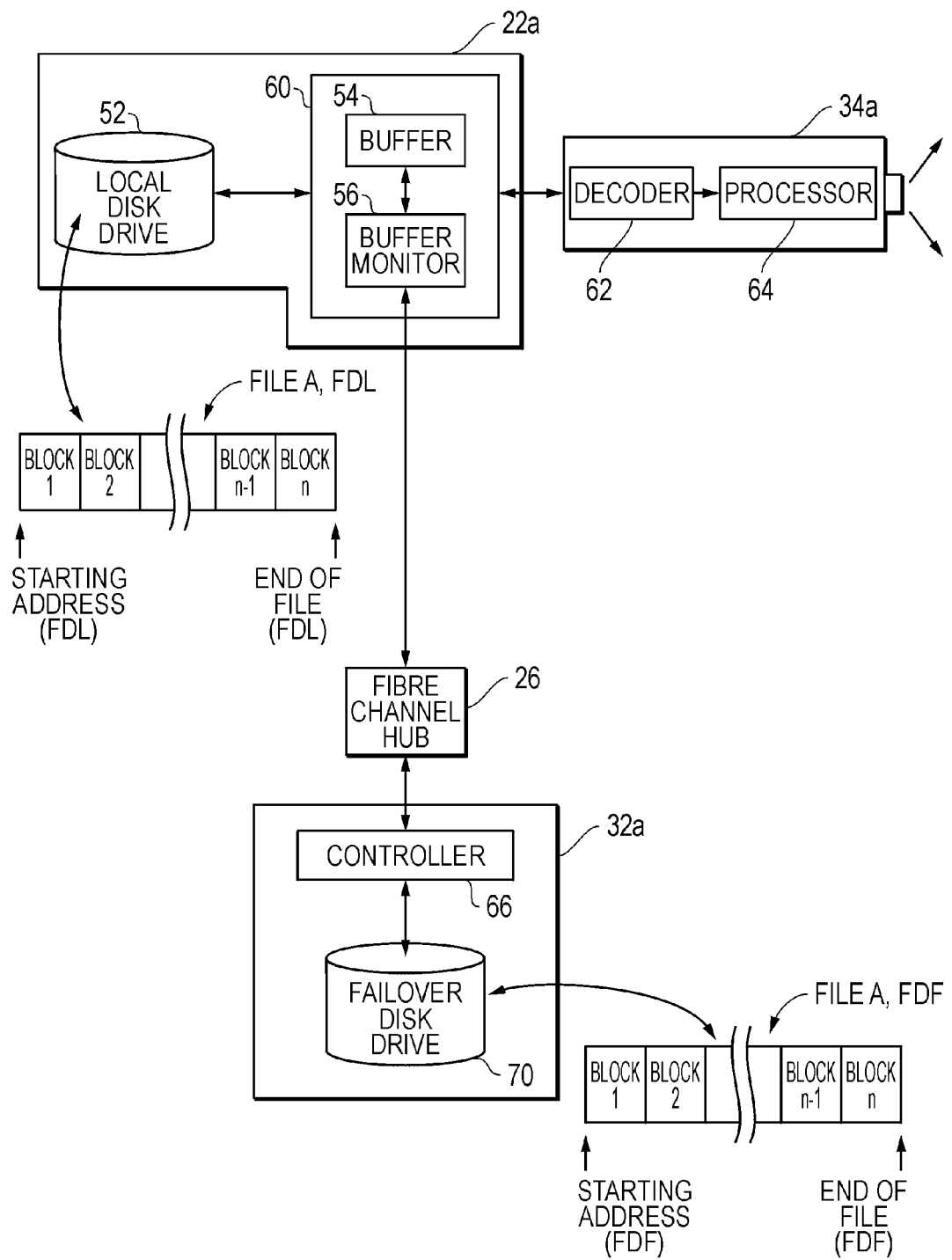
FIG. 2 is a block diagram illustrating relevant components of a screen server and digital projector of the digital cinema system shown in FIG. 1.

The present invention can be employed in a digital cinema system. FIG. 1 shows relevant components of an exemplary digital cinema system 10 employing one embodiment of the present invention, it being understood that the present invention should not be limited to use with digital cinema system 10. As shown in FIG. 2, digital cinema system 10 includes a network switch 16. For purposes of explanation only, switch 16 will operate according to an Ethernet standard, it being understood that switch 16 should not be limited thereto. Ethernet switch 16 couples a central server 20 to a computer system 12 via router 18 and the Internet. Ethernet switch 16 also couples central server 20 to screen servers 22a-22c, and a network hub 26. Each of the aforementioned devices are coupled to Ethernet switch 16 via respective Ethernet communication links.

As shown in FIG. 1, digital cinema system 10 also includes a high-speed network hub 26. Hub 26 can operate according to any one of many different standards including Gigabit Ethernet (e.g., 1000BaseT Gigabit Ethernet over copper or IEEE Standard 802.3an, October 2004 or; IEEE Standard 802.3ae, which is a version of Ethernet that runs at 10 gigabytes per second over copper) or Fibre Channel (e.g., ANSI/INCITS 303-1998, Third Generation Fibre Channel Physical and Signaling Interface (FC-PH-3) (formerly ANSI X3.303-1998); ANSI INCITS 297-1997 (R2002) Fibre Channel—Physical and Signaling Interface-2 (FC-PH-2) (formerly ANSI X3.297-1997), or; ANSI INCITS 289-1996 (R2001), Fibre Channel—Fabric Generic Requirements (FC-FG) (formerly ANSI X3.289-1996 (R2001))). For purposes of explanation only, Hub 26 will be assumed to operate according to a Fibre Channel standard, it being understood hub 26 should not be limited thereto. Fibre Channel hub 26 couples storage 30 to screen servers 22a-22c via respective Fibre Channel communication links. Storage 30 may take form in network attached storage (NAS), a storage area network (SAN), etc. The present invention, however, will be described with reference to storage 30 taking form in a SAN, it being understood that the present invention should not be limited thereto. A Fibre Channel communication link may contain two unidirectional optical cables that transmit light signals in opposite directions. Each optical cable may be attached to a transmitter of a Fibre Channel NIC at one end and a receiver in of another Fibre Channel NIC at the other end. If a Fibre Channel hub 26 is employed, copper based communication links containing copper wire, may be used to connect SAN 30 to screen servers 22a-22c.

With continued reference to FIG. 1, digital cinema system 10 further includes digital projectors 34a-34c coupled to screen servers 22a-22c, respectively. Each screen server includes at least one storage device that stores or is configured to store one or more files containing digital movies. For purposes of explanation only, it will be presumed that the storage device in each screen server 22a-22c takes form in a disk drive that includes a hard disk. Digital projectors 34a-34c show movies on screens 36a-36c, respectively, in response to reading digital content from opened movie files stored on disk drives of screen servers 22a-22c, respectively. Screen server 22a, digital projector 34a, and screen 36a are contained in or associated with auditorium 38a of digital cinema system 10, while screen server 22b, digital projector 34b, and screen 36b are contained in or associated with auditorium 38b, and server 22c, digital projector 34c, and screen 36c are contained in or associated with auditorium 38c. SAN 30 may include several storage devices 32a-32c. For purposes of explanation only, it will be presumed that the storage devices 32a-32c take form in disk arrays, each of which include one or more disk drives. Each of these disk drives includes a hard disk and a read/write head for reading the digital content of movie files stored on the hard disk. Additionally, the disk drives of SAN 30 store metadata, including the file name, starting address, end of file, etc., for each movie file stored in SAN 30.

Fibre Channel hub 26 enables a Fibre Channel LAN in which various components (e.g., screen servers 22a-22c, SAN 30, etc.) can communicate with each other, while Ethernet switch 16 enables an Ethernet LAN in which various components (e.g., screen servers 22a-22c, central server 20, etc.) can communicate with each other. For purposes of explanation only, the Fibre Channel LAN enabled by Fibre Channel hub 26 will have a higher data transmission rate when compared to the Ethernet LAN enabled by Ethernet switch 16. In one embodiment, the Fibre Channel can transmit data or commands at a rate of 2 gigabytes per second (2 GBps) or faster.

The central 20 and/or screen servers 22a-22c may function according to a digital cinema operating system (e.g., a UNIX based operating system, a Linux based operating system, a Windows based operating system, etc.). The digital cinema operating system is software that supports the loading, scheduling, control and/or playback of digital movies by digital projectors on respective screens according to auditorium schedules.

Each of the digital projectors 34a-34b can playback or present a digital movie on screens 38a-38c, respectively. However, before any of the digital projectors 34a-34b can present a digital movie, a file containing the digital movie and its associated metadata must be copied from SAN 30 to the disk drive of one of the screen servers 22a-22c, respectively, via Fiber Channel hub 26. For example, before an exemplary movie A can be presented to an audience in auditorium 38a, the file containing movie A and its associated metadata must be copied from a disk drive of, for example, disk array 32a to the disk drive of screen server 22a. In one embodiment of the present invention, the file containing the movie copied to the disk drive of a screen server, must be opened before the movie can be presented, and the file containing the movie stored on a disk drive within SAN 30, must also be opened as will be more fully described below. Thus, before movie A can be shown in auditorium 38a in accordance with an auditorium schedule, the file containing movie A in the disk drives of screen server 22a and disk array 32a, must be opened in accordance with standard operating system procedures.

In general the digital content of a file is said to be stored in a continuous portion of logical memory space, and while it is said that a file stores digital content, in reality the digital content is stored in physical memory (e.g., a hard disk) mapped to the continuous portion of logical memory space. A continuous portion of logical memory space for a file begins at the file's starting address, which may be included in the file's metadata and or in a file allocation table on a disk drive. Functional components such as file allocation tables, volume managers, operating systems, etc., can be used to translate logical memory addresses (e.g., a file's starting address) into physical memory addresses on physical memory devices (e.g., a hard disk) when, for example, data is to be read from an opened file. Data is typically read from an opened file in discrete blocks (e.g., 512 bytes). Blocks can vary in size, but for purposes of explanation only it will be presumed that data is read from files in blocks of 512 bytes, it being understood that data can be read in blocks which are greater than or less than 512 bytes. Moreover, it will be presumed that one block of data is read during a read operation, it being understood that more than one block can be read during each read operation. Read commands (e.g., instructions, transactions, requests) initiate read operations. Read commands are generated by devices seeking data, and in one embodiment Read commands identify the file to be read using a file descriptor assigned to the opened file and an offset from the starting address of the identified file where a data block is to be read.

When a Read command is received a functional component (e.g., an operating system, a file system, a volume manager, etc.) can calculate a read address within the logical address space of the file where the 512 byte block of interest is stored. In one embodiment, the read address is calculated by adding the offset of the Read command to the starting address of the file identified by the Read command's file descriptor. Thereafter, the calculated read address is translated into a physical address, and the physical address is provided to a controller of, for example, a disk drive where the file of interest is stored. The controller instructs the read/write head of the disk drive to position itself to the physical address corresponding to the calculated read address. Some time is needed to physically move the read/write head to the physical address. Once the read/write head is properly positioned, the read/write head reads 512 bytes of consecutive data from the hard disk beginning at the physical address. Ultimately, the block of 512 bytes of data read from the hard disk is returned to the device that sent the Read command.

As will be described below, a digital movie stored in a file on SAN 30 can be tracked therein as the digital content of the movie is read out of the file copied to a disk drive of a screen server. It should be noted that two or more digital movies stored in separate files on separate disk drives of SAN 30 can be simultaneously tracked therein while the digital content of the two or more movies are simultaneously read out of the separate files copied to separate disk drives of respective screen servers. For example, movies A and B, which are stored in separate files on separate disk drives of SAN 30, can be tracked therein while digital content of movies A and B are read out of copies of the files on disk drives of screen servers 22a and 22b, respectively, and presented by digital projectors 34a and 34b, respectively. Nonetheless, the present invention will be described with reference to tracking movie A in a file on disk array 32a, while the digital content of movie A is read out of the file copied to the disk drive of screen server 22a and shown by digital projector 34a, as will be more fully described below.

After a file (File A) containing a digital movie (e.g., movie A) is copied from SAN 30 to, for example, the disk drive of screen server 22a, digital projector 34a can present the digital movie to an audience in auditorium 38a. More particularly, the digital content of movie A is read from File A copied to the disk drive of screen server 22a in a consecutive block by block fashion, starting with the first block at the starting address of File A. As will be more fully described below, digital content read from File A copied to the disk drive of screen server 22a, may be temporarily stored in a buffer of screen server 22a until a request for data is received from projector 34a. For purposes of explanation, once the projector reads data from the buffer, the data read is no longer considered as being contained in the buffer.

A software or hardware error may disrupt the flow of digital content of movie A from disk drive to buffer of screen server 22a. Screen server 22a can directly or indirectly detect this data flow disruption. When the disruption is detected, screen server 22a can failover to reading the digital content of movie A stored in the opened File A on SAN 30. Moreover, because the opened File A for movie A in SAN 30 was being tracked, screen server 22a can failover and read the digital content that is needed for continuous presentation of movie A to the audience without restarting the movie. Moreover, the failover is quick such that movie A continues to be presented using digital content read from SAN 30 without the audience perceiving a noticeable difference. In other words, when the above mentioned hardware or software error occurs, screen server 22a can failover and start reading digital content of movie A at a read address in File A on SAN 30 that is approximately the same read address that was being used to read digital content from File A copied to the disk drive of screen server 22a when the disruption was approximately detected. These concepts and others are more fully described with reference to FIGS. 2 and 3.

Figure 3:
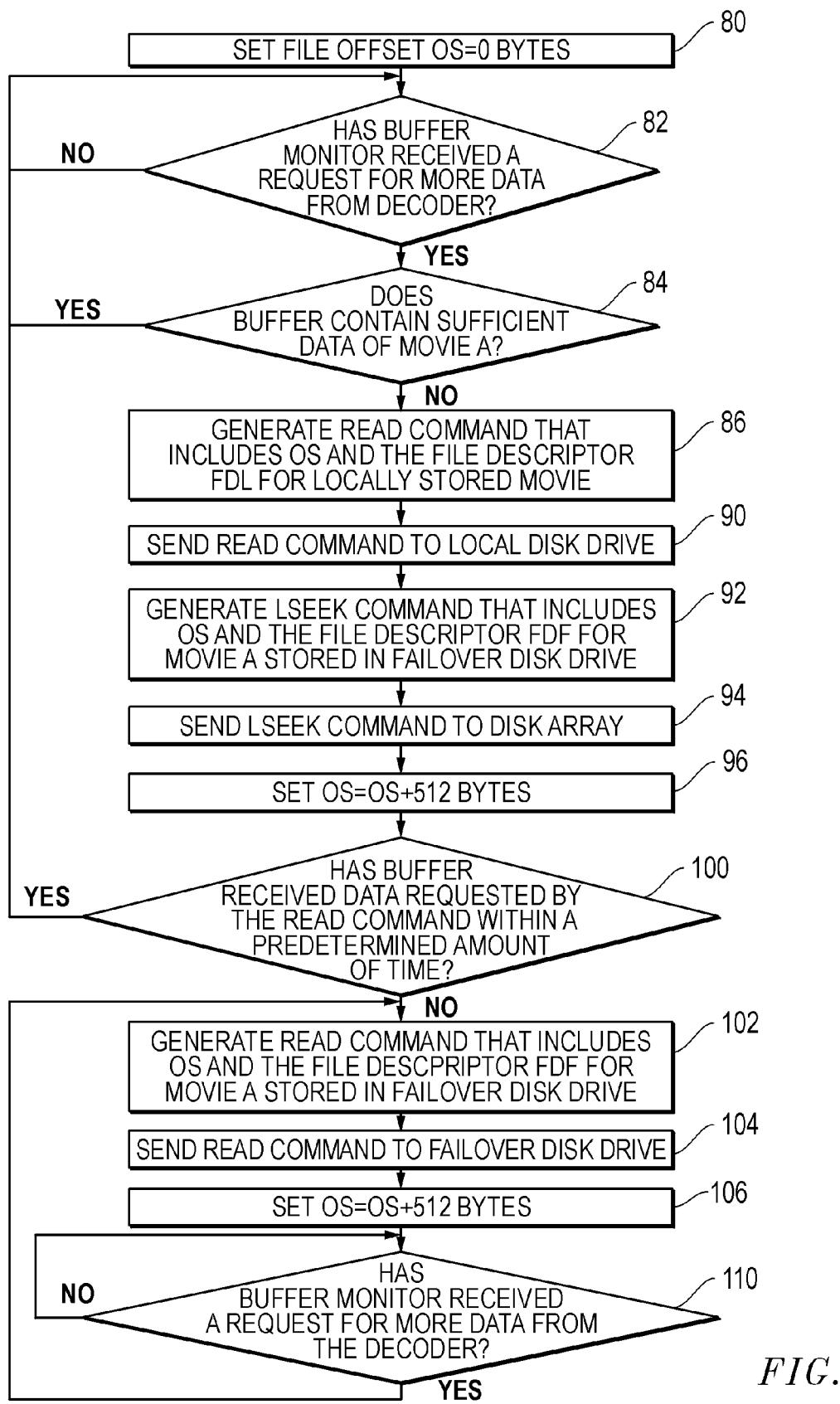
FIG. 3 is a flow chart illustrating relevant operational aspects performed by the buffer monitor of FIG. 2 in accordance with one embodiment of the present invention.

With continued reference to FIG. 1, FIG. 2 illustrates in block diagram form, a more detailed view of screen server 22a and a more detailed view of digital projector 34a. It is noted that only relevant components need to explain one embodiment of the present invention are shown in FIG. 3, it being understood that screen server 22a and digital projector 24a contain additional components. Screen server 22a includes a local disk drive 52 coupled to a controller 60, which in turn includes a decoder buffer 54 and a buffer monitor 56. Digital projector includes decoder 62 and a processor 64 (e.g., a digital light processor). Alternatively, buffer 54 may be included in digital projector 34a. It should be noted that components 52-56 of screen server 22a could be housed in digital projector 34a in an alternative embodiment.

Buffer monitor 56 may take the form of software instructions executing on a processor within screen server 22a, although it is understood that buffer monitor 56 may be implemented in hardware or a combination of hardware and software instructions. Buffer 54 may be a portion of memory (e.g., RAM) within screen server 22a specifically allocated to temporarily store movie data. In one embodiment, buffer 54 is a FIFO buffer. Buffer 54 temporarily stores digital content of Movie A until requested by digital projector 34a. In general, movie files are stored on local disk drive 52 and failover disk drive 70 in encoded format. Before a digital movie can be presented to an audience, the digital contents must be decoded by decoder 62. The output of decoder 62 is provided to processor 64 for further processing.

FIG. 2 also shows that screen server 22a is coupled to disk array 32a of SAN 30 via network hub 26. This connection enables data and commands to be transmitted between screen server 22a and disk array 32a. Disk array 32a includes a disk controller 66 and a failover disk drive 70 that contains movie files or files that store the digital content of movies, including File A that stores exemplary movie A. Controller 66 could be a component of failover disk drive 70, however for purposes of explanation only, controller 66 is shown as a device external to disk drive 70.

For purposes of explanation only, it will be presumed that movie A is scheduled to be presented in auditorium 38a at a certain time. Before movie A can be shown, File A containing A and its associated metadata is copied from failover disk drive 70 to local disk drive 52 via hub 26. FIG. 2 shows a graphical representation of File A stored on disk drive 70 and its copy on disk drive 52. Each of the files contains n blocks digital data. Block x of the files contain identical data. The metadata for each of the files contains the starting address, but the starting address for File A stored on local disk drive 52 may be different than the starting address for File A on failover disk drive 70.

After the File A is copied to local disk drive 52 and before its digital contents are presented by digital projector 34a, File A is opened on failover disk drive 70, and File A is opened on local disk drive 52. File A stored on local disk drive 52 is assigned a file descriptor FDL, while file A stored on failover disk drive 70 is assigned a file descriptor FDF. File descriptors FDL and FDF are provided to buffer monitor 56.

Buffer monitor 56 provides many functions. Buffer monitor 56 can operate to maintain a sufficient amount of digital content within buffer 54 to be read by decoder 62 so that decoder 62 is never starved for data to decode. Buffer monitor 56 can also generate commands that are used in tracking movie A stored in File A on failover disk drive 70 as the digital content of movie A is read from File A on local disk drive 52. Buffer monitor 56 can also detect a failover condition.

FIG. 3 is a flow chart illustrating relevant, operational aspects of buffer monitor 56 operating in accordance with one embodiment the present invention. The process shown in FIG. 3 initiates with step 80 just before movie A is scheduled to be shown. In step 80, buffer monitor 56 sets an internal variable called file offset (OS) to zero. OS is used to calculate read addresses as will be more fully described below. In step 82 buffer monitor 82 waits for requests for data from decoder 62. When a request is received from decoder 62, buffer monitor 56 accesses buffer 54 and checks to see if the quantity of digital data stored therein is greater than a predetermined value as shown in step 84. Initially, however, no digital data of movie A is stored in buffer 54. As such, buffer monitor 56 initially proceeds to step 86 and generates a Read command to read a block of data from File A on disk drive 52. This Read command may include the file descriptor FDL identifying the file (File A) to be accessed in addition to OS, the offset from the starting address of the file where the data block of interest can be found. The Read command generated in step 86 is transmitted to local disk drive 52 as shown in step 90. Disk drive 52 normally calculates the read address from the starting address of File A and OS contained in the Read command. The block of data (initially, block 1) at the calculated read address is read and returned to buffer monitor 56 for storage in buffer 54. Normally (i.e., after movie A has been playing for awhile) buffer 54 performs the check in step 84 after buffer monitor 56 provides data from buffer 54 to decoder 62 in response to a decoder request received during the waiting period defined by step 82.

After sending the Read command generated in step 90, buffer monitor 56 can generate another command called an Lseek command in step 92. Lseek maybe a Linux Open Source related command. The present invention should not be limited to use of the Lseek command of Linux Open Source, nor should the present invention be limited to to use of Linux Open Source or its derivatives. The Lseek command of the present invention may be used by disk array 32a to track the digital contents of movie A in File A on failover disk drive 70. The L-Seek command may include the file descriptor FDF identifying File F on failover 70 in addition to OS, the offset from the starting address of File A on failover disk drive 70 where the data block of interest (initially, block 1) can be found. It is noted that the same offset OS value is provided in the Read and L-Seek commands generated in steps 86 and 92, respectively. In step 94, the L-Seek command is transmitted to disk array 32a via hub 26. After the L-Seek command is sent in step 94, buffer monitor 56 increments its OS value by 512 bytes (i.e., the data width of one data block) as shown in step 96.

Disk array 32a receives the L-Seek command generated in step 92, and in response a processor (not shown) in disk array 32a calculates a read address for File A, the file identified by FDF in the received L-Seek command, by adding the OS to the starting address for File A. The read address is then translated into a physical address on the hard disk of failover disk drive 70 where the block of interest is stored. The physical address and a head move instruction can then be sent to controller 66. In response, controller 66 moves the read/write head of the disk drive 70 to the position on the hard disk corresponding to the physical address. However, the read/write head does not read data in one embodiment of the present invention. The primary purpose of the move instruction is to position the read/write head to a position on the hard disk corresponding to the physical address associated with the move instruction. In this fashion, the digital content of movie A stored in File A on failover disk drive 70, is tracked as digital data of File A copied to local disk drive 52 is read out and stored in buffer 54.

In an alternative embodiment, the Lseek command generated and transmitted in steps 92 and 94 could be replaced by a Read command that contains the current value of OS and file descriptor FDF. Disk array 32a may receive this Read command and return the corresponding data block of File A on failover disk drive 70 to, for example, screen server 22a where it is stored in a separate buffer (called a failover buffer, not shown), i.e., a buffer other than buffer 54. The failover buffer may be external to screen server 22a. The failover buffer may be configured to hold the same quantity of data as buffer 54. The failover buffer may also be a FIFO buffer. The oldest data is removed from the failover buffer when the failover buffer receives a new data block from failover disk drive 70, assuming the failover buffer doesn't have any unused extra memory to store the new data. At any given point in time in this alternative embodiment, the failover buffer should store substantially the same data as buffer 54. In another embodiment, the Lseek command can be replaced by a READ-NO-XMIT command. Disk array 32a may receive this READ-NO-XMIT command and return the corresponding data block of File A on failover disk drive 70 to, for example, local memory (e.g., a cache) of the disk array 32a. The copy of the read data, however is not returned to buffer monitor 56 in response to the READ-NO-XMIT command. Rather, the read data remains in the local memory until read in response to a subsequent Read command from buffer monitor 56. The data block stored in the local memory can be replaced by a newer block of data at a time in the future after the original data block is no longer useful. For example, the data stored in the local memory can be replaced by a newer block of data read from failover disk drive 70 in response to a subsequent READ-NO-XMIT command generated in step 92. In still another embodiment the READ-NO-XMIT command can be translated into one or more available disk commands to accommodate reduction of the read/write head positioning latency to a value low enough to allow data to flow from failover disk drive 70 to buffer 54 in time to avoid being noticed by the audience in auditorium 38a.

A hardware or software error may prevent the implementation of the Read command generated in step 86, or in other words a hardware or software error may prevent digital content of movie A from being read from File A on local disk drive 52 and stored in buffer 54. Buffer monitor 56 can directly or indirectly detect this hardware or software error in one embodiment by determining in step 100 whether the data block sought by the Read command generated in step 86 has been returned to and stored in buffer 54 within a predetermined time after generating the Read command in step 86 or after sending the Read command in step 90. If the data block sought by the Read command is successfully stored in buffer 54 within the predetermined amount of time, then there is no error detected and buffer monitor 56 returns to the wait mode defined by step 82. If, however, buffer monitor 54 determines in step 100 that the data block sought is not successfully returned and stored in buffer 54 within the predetermined amount of time, an error is presumed, and buffer monitor 56 enters a "failover mode," one embodiment of which is defined by steps 102-110.

It is noted that buffer monitor 56 may detect hardware or software errors using alternatives other than determining in step 100 whether the data block sought by the Read command is or is not successfully returned and stored in buffer 54 within the predetermined amount of time. Step 100 could be replaced with a more generic step of determining whether one or more pre-determined error conditions exist that prevents data from being returned to buffer 54. For example, buffer monitor 56 may initiate the failover mode set forth in steps 102-110 in response to receiving an error message from local disk drive 52 after buffer monitor sends the Read command in step 90. Further, screen server 22a may include a second memory device (e.g., a second disk drive) that stores a mirror copy of File A on disk drive 52, and data blocks read from disk drive 52 can be compared with their mirrors on the second memory device. If the comparison yields a mismatch, than an error message can be issued, and buffer monitor 56 can enter the failover mode in response. Other detection methods are contemplated.

Buffer monitor 56 enters failover mode of steps 102-110 when buffer monitor 56 determines an error has been detected in step 100. In failover mode, buffer monitor 56 can provide digital content of Movie A from File A that is being tracked on failover disk drive 70. The failover mode starts in step 102 when buffer monitor 56 generates a Read command. This Read command generated in step 102 may include the file descriptor FDF identifying the file to be accessed in addition to OS, the offset from the starting address of File A where the data block of interest can be found. It is noted that the value of OS is the same value that was sent in the last Read command generated in step 86 just before buffer monitor 56 enters the failover mode. The Read command generated in step 102 is transmitted to disk array 32a via hub 26 as shown in step 102. Disk array 32a, in response, may calculate a read address from the OS contained in the received Read command and the starting address for File A on disk drive 70, although this step may not be needed as will be more fully described below. The read address is then translated into a physical address on the hard disk of failover disk drive 70 where the block of interest is stored. The physical address and a read instruction is then sent to controller 66. Importantly, the read/write head of disk drive 70 need not be moved to the position on the hard disk corresponding to the calculated physical address and where the data block of interest is stored since the read/write was pre-positioned to read the data block of interest as a result of implementing the last L-Seek command sent in step 94 just before buffer monitor 56 entered the failover mode. As such, the read/write head of disk drive 70 immediately reads (i.e., no need to wait for the read/write head to be moved to the proper position on the hard disk) the block of data on the hard disk, and the block of data read is returned to buffer monitor 56 and stored in buffer 54. Because there is no need to reposition the read/write head when the failover mode is first entered, and because hub 26 can transmit instructions and commands at a very high speed, the data block is returned to buffer monitor 56 and stored in buffer 54 in a very short amount of time, i.e., an amount of time that prevents the situation where buffer 54 is empty and cannot supply data of movie A to decoder 62 immediately upon request therefrom.

After buffer monitor 56 sends the Read command in step 104, buffer monitor increments OS by 512 bytes as shown in step 106. Then buffer monitor 56 waits for another request for data from decoder 62 as shown in step 110. Although not shown in failover mode of FIG. 3, when another request is received from decoder 62, buffer monitor 56 accesses buffer 54 and checks to see if the quantity of digital data stored therein is greater than the predetermined value, just as it does in step 84. If buffer 54 contains sufficient data during the check, buffer monitor 56 moves data from buffer 54 to decoder 62 in response to the decoder request, and buffer monitor would return to the wait state defined by step 106. If buffer 54 lacks sufficient data after checking, buffer monitor would also repeat steps 102 and 110 to refill buffer 54 with more data of movie A copied from failover disk drive 70, and buffer monitor 56 would still move data from buffer 54 to decoder 62 in response to the decoder request.

In the alternative embodiment mentioned above in which the Lseek command generated and transmitted in steps 92 and 94 is replaced with a Read command containing OS and FDF, buffer monitor 56 can return data to decoder 62 from the failover buffer if buffer 54 fails to receive data under the conditions set forth in step 100. The failover mode of steps 102-110 continue, but buffer monitor 56 returns data to decoder 62 from the failover buffer for each request received from decoder 62. In yet another embodiment, data is returned from the local memory that stores data read during execution of the READ-NO-XMIT command mentioned above.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a first computer generating a first command to read a first block of data from a file stored on a first memory device, wherein the first computer system is coupled to a digital projector;
   the first computer system generating a second command;
   the first computer system transmitting the second command to a device external to the computer system, wherein the device comprises a hard disk that stores a copy of the file, and wherein the device comprises a read/write head;
   in response to the device receiving the second command, moving the read/write head to a position on the hard disk where the read/write head can read a copy of the first block of data stored on the hard disk.

* * * * *